United States Patent
Reuter et al.

(10) Patent No.: US 6,718,404 B2
(45) Date of Patent: Apr. 6, 2004

(54) DATA MIGRATION USING PARALLEL, DISTRIBUTED TABLE DRIVEN I/O MAPPING

(75) Inventors: James M. Reuter, Colorado Springs, CO (US); David W. Thiel, Colorado Springs, CO (US); Richard F. Wrenn, Colorado Springs, CO (US); Robert G. Bean, Monument, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 348 days.

(21) Appl. No.: 09/872,721

(22) Filed: Jun. 1, 2001

(65) Prior Publication Data

US 2002/0019922 A1 Feb. 14, 2002

Related U.S. Application Data

(60) Provisional application No. 60/209,109, filed on Jun. 2, 2000, and provisional application No. 60/209,326, filed on Jun. 2, 2000.

(51) Int. Cl.[7] .............................................. G06F 13/14
(52) U.S. Cl. .................... 710/20; 711/102; 711/203; 711/204; 711/205; 711/206
(58) Field of Search ........................... 710/20; 711/102, 711/206, 203, 204, 205

(56) References Cited

U.S. PATENT DOCUMENTS

| | | | | |
|---|---|---|---|---|
| 5,787,487 A | * | 7/1998 | Hashimoto et al. | 711/165 |
| 5,835,964 A | * | 11/1998 | Draves et al. | 395/416 |
| 5,940,850 A | * | 8/1999 | Harish et al. | 711/102 |
| 6,223,271 B1 | * | 4/2001 | Cepulis | 711/206 |
| 6,433,787 B1 | * | 8/2002 | Murphy | 345/556 |
| 6,526,472 B2 | * | 2/2003 | Suzuki | 711/103 |

OTHER PUBLICATIONS

Montague, Robert M. et al., Virtualizing The SAN, Morgan Keegan & Company, Inc., Jul. 5, 2000, pp. 1–20.

* cited by examiner

Primary Examiner—Abdelmoniem Elamin

(57) ABSTRACT

A system for moving physically stored data in a distributed, virtualized storage network is disclosed. A group of data sets is written to a first storage device as part of a write operation such as migration. A plurality of storage devices partially filled with data are designated as substitutes. The write operation to the first storage device is suspended upon receiving a request to read a data set stored in the first storage device, such as occurs in a recall operation. A second storage device is then selected from the plurality of substitute storage devices. The write operation is continued by writing data sets from the group of data sets included in the write operation that were not written to the first storage device to the selected second storage device. The requested data is then read from the first storage device. After data has been read from the first storage device, the first storage device may be designated as a substitute storage device so that the partially filled first storage device may be selected for continuing write operations. Data sets from substitute storage devices may be transferred or merged into a lesser number of storage devices during recycle operations to prevent the number of substitute storage devices from increasing beyond a predetermined limit or goal. Recycling operations in which data sets from different storage devices are transferred or merged may be performed by building a first queue including a list of filled tapes ordered according to the least amount of valid data and a second queue including all unassociated partially filled storage devices ordered by the amount of available storage space, and merging.

15 Claims, 5 Drawing Sheets

DATA MIGRATION USING PARALLEL, DISTRIBUTED TABLE DRIVEN I/O MAPPING

RELATED APPLICATIONS

This application claims priority from U.S. Provisional Application Nos. 60/209,109 and 60/209,326, filed on Jun. 2, 2000, the disclosures of which are hereby incorporated by reference in full.

FIELD OF THE INVENTION

The present invention relates to a method using a distributed, virtual disk storage system to move data among storage devices.

BACKGROUND OF THE INVENTION

A storage area network (SAN) operates, in effect, as an extended and shared storage bus between hosts and storage devices to offer improved storage management, scalability, flexibility, availability, access, movement, and backup. Storage virtualization in the SAN further improves storage through the separation of host system views of storage from physical storage. In a virtual storage system, the hosts connect to the storage devices through a virtual disk that maps to the data on the storage devices. This allows new storage management value to be introduced, including the ability to migrate data among physical storage components without effecting the host view of data. As a result, data may be repositioned within a storage device or copied to a separate storage device seamlessly, without significantly affecting the operation and performance of the host. To take advantage of the new virtual storage, it is the goal of the present invention to provide an improved methodology for moving data within the storage devices.

It is a further goal of the present invention to provide a methodology for seamlessly migrating data files in virtualized storage networks using parallel distributed table driven I/O mapping. These systems concurrently use multiple copies of a mapping table. A main challenge of data migration in a distributed virtual network is coordinating the separate copies of the mapping table so that the host does not effect the data during migration and have access to the moved data after migration. Current solutions exist in architectures that are not distributed among hosts or not distributed across storage subsystems.

BRIEF DESCRIPTION OF THE DRAWINGS

These and other advantages of the present invention are more fully described in the following drawings and accompanying text in which like reference numbers represent corresponding parts throughout.

DETAILED DESCRIPTION OF THE PREFERRED EMBODIMENT

Figure 1A:
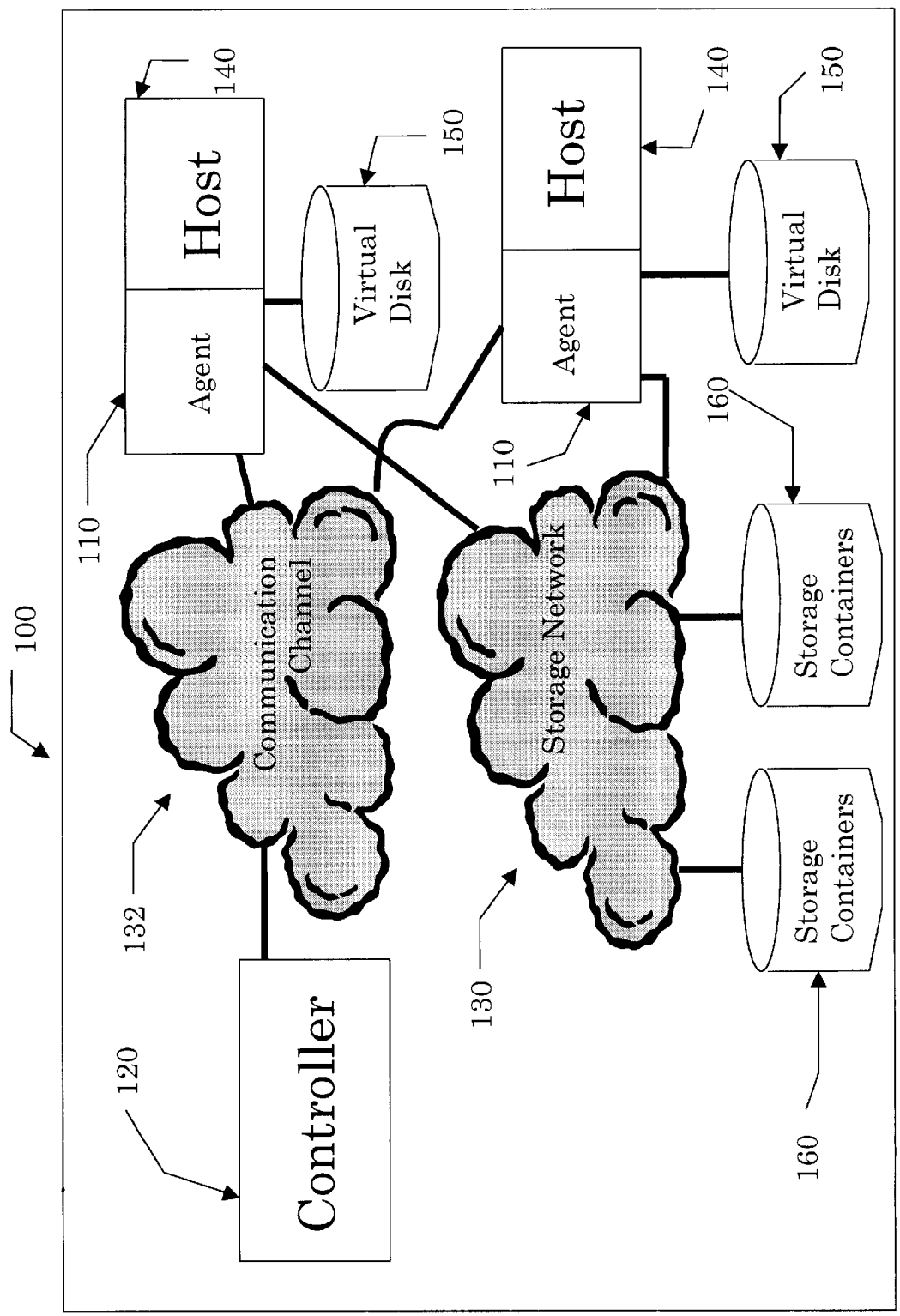
FIGS. 1A and 1B are schematic illustrations of a distributed virtual storage network.

The present invention applies to a virtualized storage area network (SAN) system 100 using one or more distributed mapping tables 200, as needed to form one or more virtual disks for input/output (I/O) operations between hosts and storage devices, as illustrated in FIG. 1. In particular, the table 200 contains a mapping that relates position in a virtual disk with an actual location on the storage devices. The specific contents of the table 200 are described in greater detail below.

The system 100 principles of distributed, virtual table mapping can be applied to any known storage area network 130. It should therefore be appreciated that the storage containers 160 are known technologies and may refer to any type of present or future known programmable digital storage medium, including but not limited to disk and tape drives, writeable optical drives, etc. Similarly, the hosts may be any devices, such as a computer, printer, etc. that connect to a network to access data from a storage container 160.

Likewise, the storage network 130 is also intended to include any communication technology, either currently known or developed in the future, such as the various implementations of Small Computer Systems Interface (SCSI) or Fibre Channel. This distributed virtualization is most useful in environments where a large amount of storage is available and connected using some sort of infrastructure. One preferred implementation uses Switched Fibre-Channel connected storage. However, nothing in the design of the system 100 precludes its use on other types of storage networks 130, including storage networks that are not yet invented.

The hosts issue I/O requests to the virtual disk 150, causing the multiple mapping agents 110 to access the mapping table 200. The system 100 uses multiple agents 110 that are associated with the hosts. Preferably, each host has a separate agent 110, but the system 100 could be easily configured so that more than one host connects to an agent 110. If multiple hosts connect to the same agent 110, the hosts concurrently share access to that agent's table 200. The agent 110 stores the mapping table 200 in volatile memory such as DRAM. As a result, if one of the agents 110 loses power, that agent 110 loses its copy of the table 200. Such an event could take place if the mapping agent 110 is embedded in the host 140, for example, a backplane card serving as the mapping agent 110, and the host 140 system loses power.

By storing the mapping table 200 in volatile memory, the table 200 can be easily and rapidly accessed and modified on the agents 110. Storing the mapping table 200 in volatile memory has the further advantage of substantially reducing the cost and complexity of implementing the agents 110 as mapping controllers. Overall, the agents 110 allow the performance-sensitive mapping process to be parallelized and distributed optimally for performance. The mapping agents 110 reside on a host 140 or the storage network 130 and, in conjunction with the controller 120, fabricate the existence of a virtual disk 150. Thus, the mapping agent receives, from the host, the I/O request to access the virtual disk 150, performs the necessary mapping, and issue the resulting I/O requests to the physical storage containers 160.

The system 100 further comprises a controller 120 that is separate from the mapping agents 110. The controller 120 administers and distributes the mapping table 200 to the agents 110. Control of the mapping table 200 is centralized in the controller 120 for optimal cost, management, and other implementation practicalities. The controller 120 further stores the mapping table 200 in a semi-permanent memory, preferably a magnetic disk, so that the controller 120 retains the table 200. In this way, the responsibility for persistent storage of mapping tables 200 lies in the controller 120 so that costs and complexity can be consolidated. Overall, the controller 120 is chosen for optimal cost, management, and other implementation practicalities.

The exact design of the controller 120 is not a subject of this disclosure. Instead, this disclosure focuses on the structure of the overall system and the interfaces between the mapping agent 110 and the controller 120. Accordingly, it should be appreciated that any controller, as known in the art of digital information storage, may be employed as needed to implement the present invention. Within this framework, each of the mapping agents 110 preferably do not interact with the other agents 110. Furthermore, the architecture allows for a controller 120 comprised of redundant, cooperating physical elements that are able to achieve very high availability. As a result, the system 100 is highly scaleable and tolerant of component failures.

Figure 1B:
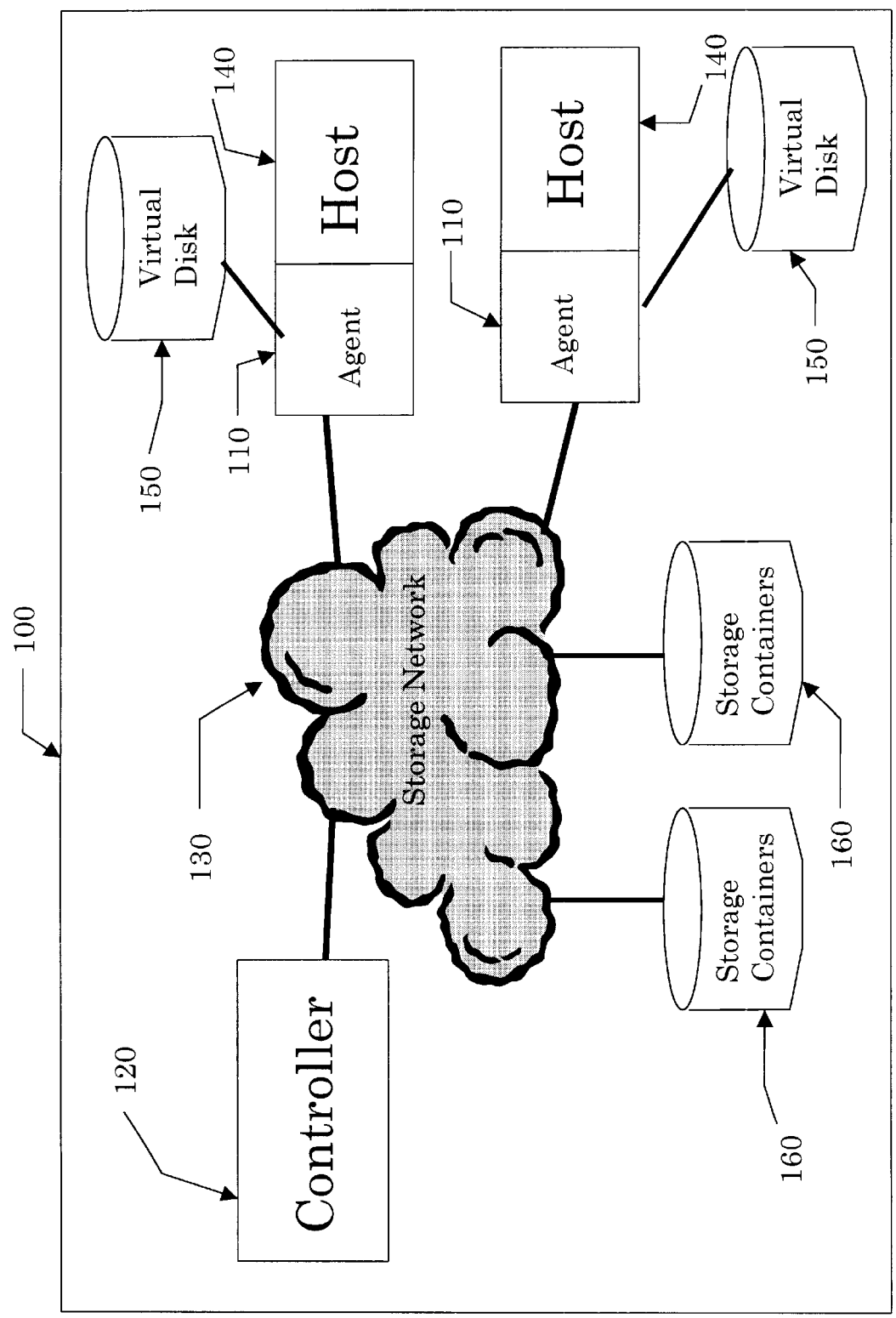

As described below, the interaction of the controller 120 and the mapping agents 110 are defined in terms of functions and return values. In a distributed system 100, as illustrated in FIG. 1A, the communication is implemented with messages on some sort of network transport such as a communication channel 132. The communication channel 132 may employ any type of known data transfer protocol such as TCP/IP. In another implementation, as illustrated in FIG. 1B, the distributed system 100 employs a communication channel that is the storage network 130 itself. Any suitable technique may be used to translate commands, faults, and responses to network messages. The particular interactions between the functions and activities of the controller 120 are described in greater detail below.

Figure 2:
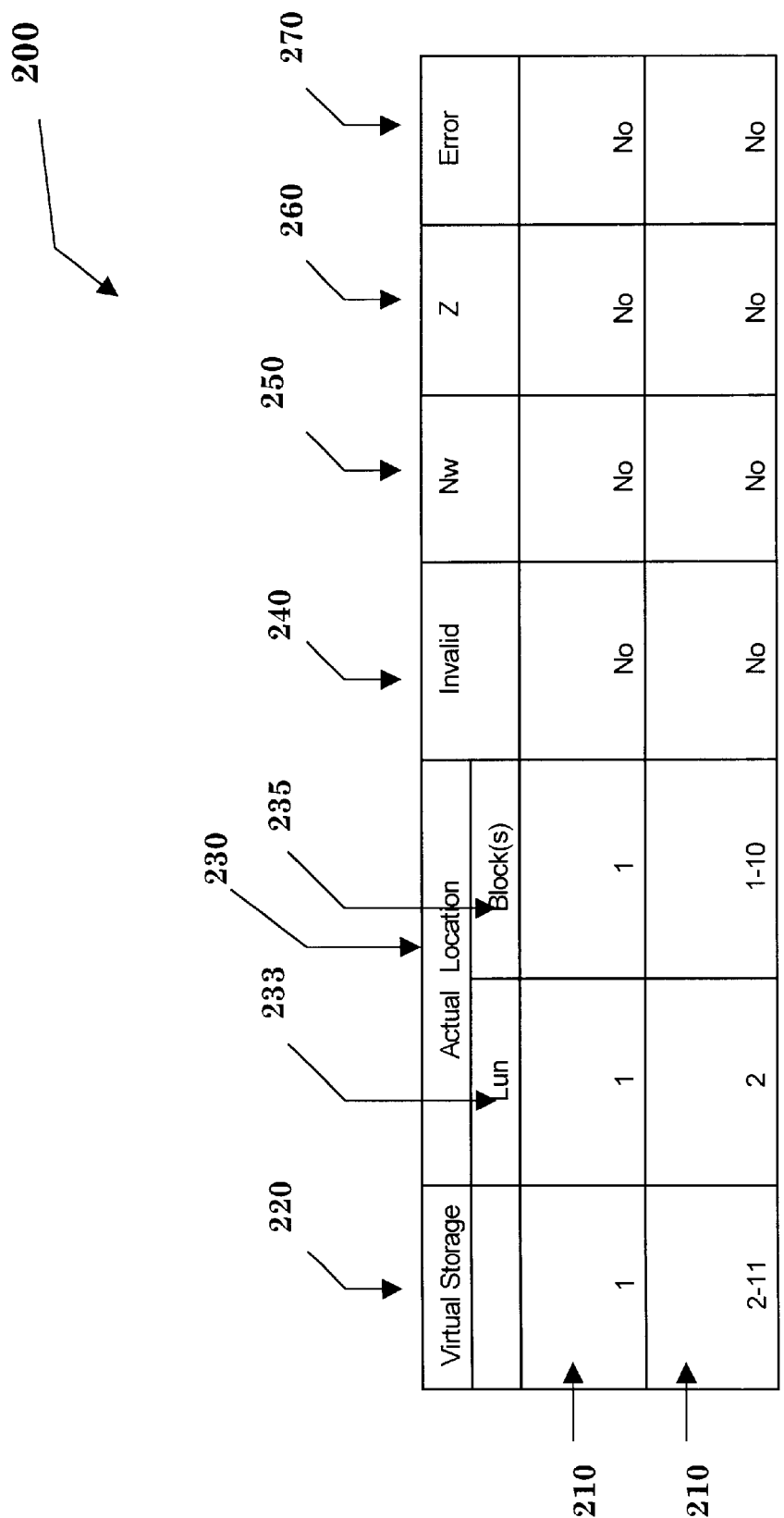
FIG. 2 is an illustration of a table for mapping virtual disk entries to physical storage locations.

FIG. 2 schematically illustrates the contents of the mapping table 200. As described above, the table 200 contains entries 210 (rows) that include a mapping between one or more virtual disk segments 220 and storage locations 230 on the storage devices. The storage locations 230 identify the particular storage device and part of the storage device, which correspond to the virtual disk index. The form for the storage locations 230 must be appropriate for the storage network being used. In a SCSI network, each of the storage locations 230 includes a LUN identifier 233 and a block identifier 235, also called an offset. All of the other fields in a mapping table entry 210 are simple integers or binary state values.

This disclosure describes the mapping table 200 as having one entry 210 per each "disk block" of virtual disk, 220. While possible to build, this would result in huge mapping tables and highly fragmented mapping, both of which introduce undesirable performance degradations. In another implementation, each mapping table entry 210 represents a variable sized group of contiguous virtual disk blocks that map to contiguous blocks on one of the physical storage devices. This configuration of the table 200 offers great mapping flexibility and very dense mapping structures, but introduces greater algorithmic complexity in managing the variable sized blocks and greater map entry lookup costs. Therefore, the table 200 may use mapping table entries 210, each having a fixed size number of contiguous blocks ("segments") on the virtual disk that map to one storage device.

While this configuration for the table 200 is possibly not as dense as variable sized block mapping, the configuration offers the simplest and highest performance map access and space management. In this configuration, each of the entries 210 contains a virtual disk segment 220 instead of a virtual disk block. Regardless of the specifics of the table 200, the table 200 must map a virtual disk segment 220 to each physical storage block involved in I/O operations. Alternatively, each of the entries 200 could contain a storage location block 235, instead of a virtual disk segment 220 data configuration. This would arise in a situation where the physical container 160 is partioned into identical segments.

In another configuration, the system 100 has multiple tables 200, each having different mappings between a virtual disk and the storage devices. In this way, different hosts may have different access to the same storage device. When the mapping table 200 does not include one of the storage locations 230, hosts using this table (i.e., the hosts connect to the agent 110 that stores this table) cannot access information stored at a storage location 230. In fact, the host will not realize that this storage location 230 exists.

In addition to mapping information specifying the storage location 230, each mapping table entry 210 also contains several states. The states are Boolean variables that provide information on the current status of the virtual disk segment 220 and are important because they allow the mapping table 200 stored in the agent 110 to be remotely loaded and manipulated from the controller 120. These states and interfaces provide the ability for the mapping tables to be distributed and for mapping table entries to be volatile.

The disclosure first describes the states prior to explaining some of the functions for the states. The table 200 generally includes at least two states: (1) an invalid state 240 indicating whether any I/O operations may occur on the virtual disk segment 220 and the corresponding physical storage location 230; and (2) a no-write (Nw) state 250 indicating whether the data contained at the corresponding physical storage location 230 may be changed. The invalid state 240 and the Nw state 250 are particularly important in allowing dynamic loading of mapping table entries, dynamic mapping changes, volatility of mapping table entries, and data sharing among similar virtual disks.

When activated, the invalid state 240 generally indicates that the mapping table entry 210 contains no useable mapping information and cannot support I/O operations. Any attempt to implement an I/O operation through the table entry 210 causes the mapping agent 110 to send a fault message to the controller 120. The agent 110 does not proceed with the I/O operation until the controller 120 returns a fault response. In one configuration, the system 100 initially activates the invalid state 240 for all entries 210 in the table 200 when the table 200 is newly created. In this way, the table 200 ignores any residual entries in memory from previously stored tables to insure that current entries are active and reliable. Similarly, the invalid state 240 may be activated when entry 210 is "forgotten" and lost by the agent 110 volatile memory. If the invalid state 240 is activated in the entry 210, then all other values and states in the entry 210 are assumed to contain no valid information and are ignored.

Because the tables 200 located in the mapping agents 110 are volatile, any failure or restart of the mapping agents 110 causes all of the entries 210 to have an active invalid state 240. A sustained loss of communication between the controller 120 and mapping agent 110 also causes I/O operations to stop: either by making all mapping table entries revert to an active invalid state 240 or by adding additional mechanisms to suspend I/O operations until directed by the controller 120 to resume I/O operations. This configuration allows the controller 120 to continue coordinating other mapping agents 110 by indicating that a failed or unreachable mapping agent 110 has been placed into a known state, providing the controller 120 data access to the surviving mapping agents 110.

As presented above, the Nw state 250, when active, indicates that any write operations to the virtual disk segment(s) 220 represented by the entry 210 cause the agent 110 to send a fault message to the controller 120. The agent 110 does not allow the host to write to the storage locations 230 until the controller 120 returns a fault response to deactivate the Nw state 250. Unlike the invalid state 240, the activated Nw state 250 does not prevent read operations from generating faults. Instead, the agent 110 generally allows the host to proceed to access data at the storage location 230. Accordingly, if only the Nw state is activated, the mapping table entry 210 must contain a useable storage location 230. Alternatively, other means of allowing the write to complete under the direction of the controller 120 are envisioned by this disclosure, e.g., a do_write command that writes to a second storage location.

In another configuration, the mapping table 200 further includes a zero (Z) state 260. When active, the Z state 260 indicates that the virtual disk segment 220 represented by the entry 210 contains all zero bytes. This feature allows a virtual disk to be created and gives the virtual disk the appearance of being initialized without the need to allocate or adjust any underlying non-virtual storage. If an entry 210 contains an active Z state 260, the agent 110 ignores the storage address 230. If the host attempts to read information stored at a storage location 230, the agent 110 returns only zero-filled blocks regardless of the actual contents of the storage location 230. On the other hand, any attempt to write data at the storage location 230 when the Z state 260 is activated will cause the agent 110 to send a fault message to the controller 120. The agent 110 does not allow the host to write to the storage locations 230 until the controller 120 returns a fault response that deactivates the Z state 260.

In another configuration, the mapping table 200 further includes an error (E) state 270. When active, the E state 270 indicates the existence of a pre-existing error condition preventing I/O operations to the virtual disk segment 220 represented by the table entry 210. If an entry 210 contains an active E state 270, the agent 110 ignores the storage location 230. If the host attempts to read from or write to the storage location 230, the agent 110 returns an error to the host.

The interaction of the agent 110 and the controller 120 is now described in greater detail. In one category of interactions, fault/response operations, the agent 110 sends a message to the controller 120 to indicate the occurrence of a fault during an I/O operation to the table 200. Typically, the fault occurs as a result of an activated state, as described above, that prevents the execution of the I/O operation by the agent. The agent 110 sends the fault message to the controller 120. The controller 120 then determines an appropriate action and commands the agent 110 accordingly.

In one type of fault/response operation, a map fault, the mapping agent 110 alerts the controller 120 that an I/O operation requested by the host cannot be completed because the mapping table entry 210 has an activated state preventing the completion of the requested I/O operation. For example, the mapping agent 110 produces a fault message to the controller 120 in response to a request for any I/O operation to a table entry 210 having an activated invalid flag 240 or an attempt to write to storage location 230 having an active corresponding Nw flag 250. The map fault message from the agent 110 generally identifies the requested I/O operation, the virtual disk segment 220 involved, and the table state preventing the I/O operation. After a fault occurs, the agent does not attempt to carry out the I/O operation. Instead, the controller 120 uses the fault message to select the proper response to the faulted I/O operation (e.g. load map entry, change map entry, delay until some other operation has completed). The controller 120 response informs the mapping agent 110 how to proceed to overcome the cause for the fault.

The controller 120 generally instructs the agent 110 either to resolve the problem or to send an error message to the requesting host. When resolving the problem, the controller 120 sends a replacement table entry 210. The agent 110 inserts the new table entry 210 in the table (in place of the former faulty entry) and then retries the I/O operation. If the controller 120 cannot resolve the problem, it instructs the mapping agent 110 to issue an error message to the host and to activate the error state 260 for the table entry 210 causing the fault. As described above, the agent 110 then issues an error message to the host regardless of the other contents of the table entry 210.

Commands to the agent 110 initiated by the controller 120 comprise a second category of interactions: command/response operations. These commands initiated by the controller 120 include the creation of a new mapping table 200 (new_table) with all entries set to have an activated invalid flag or the deletion of an existing table 200. The controller 120 can obtain from the agent 110 the contents of one of the entries 210 (get_entry) or the status of the one of the states in this entry 210 (get_status). The controller 120 can further order the agent 110 to set all of the contents for one of the entries 210 (set_entry) or the status of one of the states for the entry 210 (set_entry_state).

Once the invalid state 240, the error state 260, or the zero state 270 are active, the controller 120 cannot merely deactivate the state because, as described above, initial activation of these states voids the storage location 230. To deactivate these states, the controller 120 must instruct the agent 110 to replace the existing entry 210 with an entirely new entry (set_entry). With all of these commands, the agent 110 returns a response to the controller 120 after completing the ordered task.

When the controller 120 instructs the agent 110 to either set or obtain information from the table 200, the system optimally allows the controller 120 to specify multiple, contiguous map table entries 210 in a single command. This allows the agent 110 and the controller 120 to interact more efficiently, with fewer instructions. However, when the controller 120 commands the agent 110 to set one table entry 210, multiple table entries 210, one state for table entry 210, or multiple states for table entry 210, the controller 120 command to the agent 110 optimally includes a "blocking" flag or state. The blocking state is stored in the controller 120 command and applies to only this command. Neither concurrent nor subsequent commands are affected by this blocking state. During an I/O operation, the activation of the blocking flag prompts the agent 110 to change the table 200 immediately, but agent 110 should not respond to the controller 120 until after the completion of any prior I/O operations initiated before the controller 120 command.

During a majority of the operations, the mapping agent 110 operates without fault. In non-fault cases, the mapping table entries 210 are valid and do not have any activated states to prevent the requested I/O operation. The virtual disk I/O operations function entirely through the mapping agent 110. The I/O operation proceeds through the mapping table 200 and directly to the physical storage devices without any involvement by the controller 120. As a result, the controller 120 inserts itself into an I/O stream only when needed to perform various management operations and typically does not become involved in non-faulting cases. Thus, the controller 120 is typically not involved in the I/O operations, providing the system 100 with high performance and scalability. The virtual disk having been created as described above, a persistent copy of mapping table 200 for the virtual disk exists on the controller 120, and volatile copies of some or all entries in the mapping table 200 are distributed to at least one mapping agent 110.

This disclosure now describes the process for migrating the virtual disk data to different physical storage locations 230. The system 100 generally allows virtual disk data migration to be done on a per-map-entry basis, preferably fixed-sized segments.

Virtual disk data migration is generally done in response to a user request or an automated policy decision to move virtual disk data from one physical storage location 230 to another. The policies, or user requests, that stimulate this operation and determine the choice of a new physical storage location 230 for a segment are outside the scope of this disclosure. This disclosure is limited to the process used to perform the migration given a known storage location and a desired storage location. It is assumed that the command to initiate this process identifies (1) the virtual disk location involved in the migration, (2) the existing physical location of a segment to be moved, and (3) the desired new physical location to move that segment.

Figure 3A:
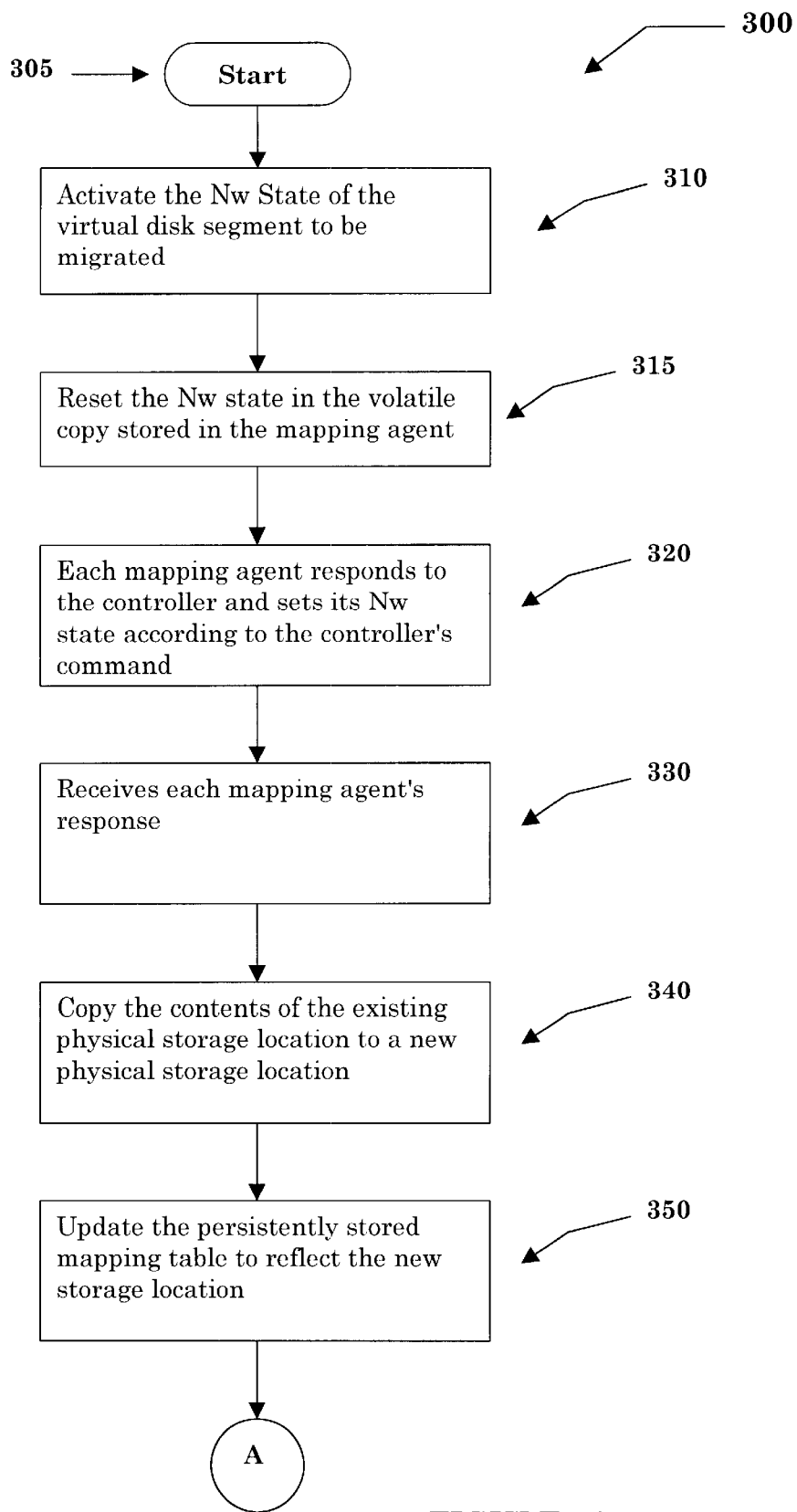
FIGS. 3A–3B is a flow chart illustrating the steps in a methodology for migrating data in the distributed virtual storage network of FIG. 1 in accordance with a preferred embodiment of the present invention.
Figure 3B:
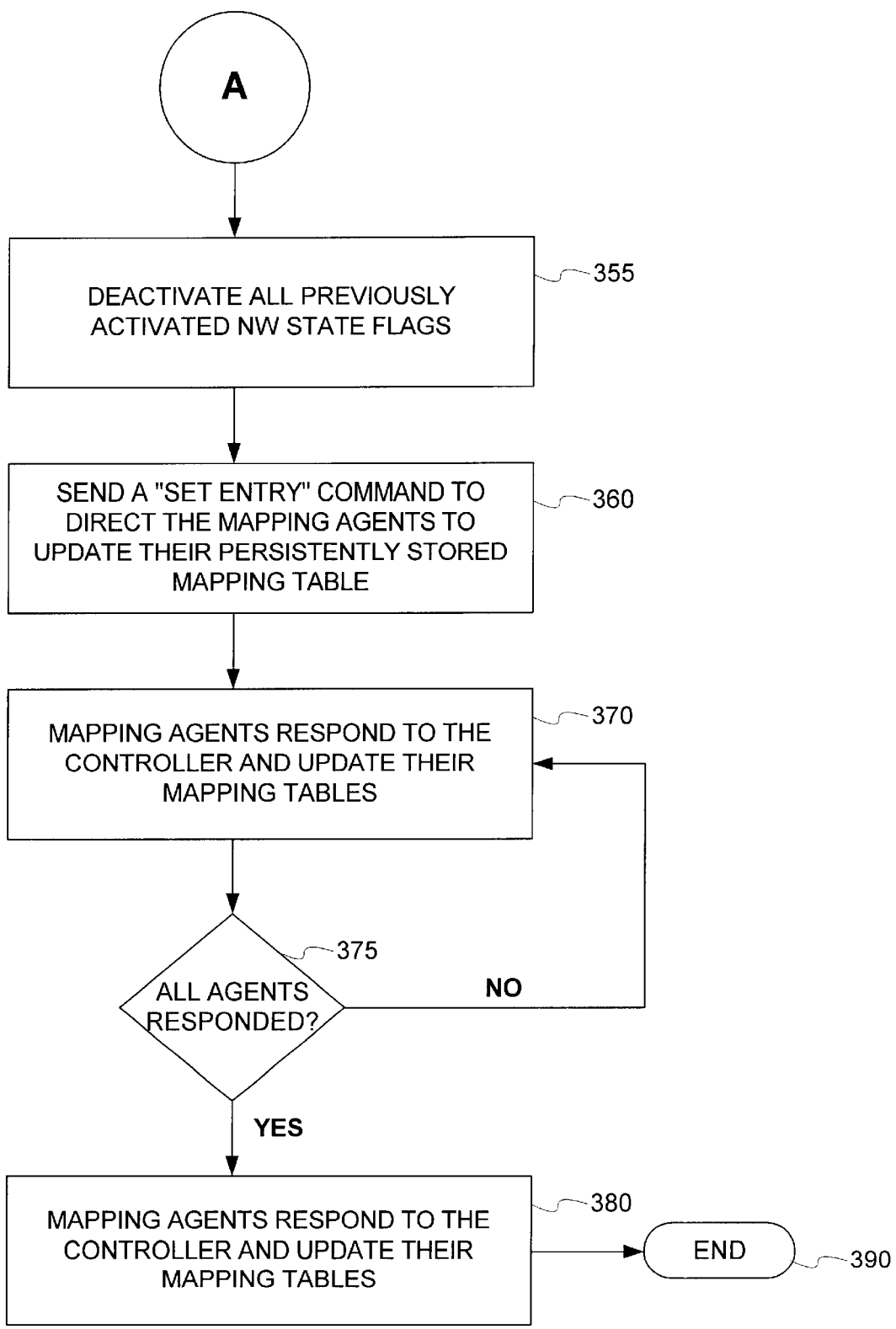

FIGS. 3A and 3B schematically illustrate the migration process 300, which begins at step 305. In response to the command to migrate data stored on a virtual disk, the controller 120 activates the Nw state 250 for the virtual disk segments 220 to be migrated, step 310. Specifically, the controller 120 changes its persistently stored copy. The controller 120 then issues an order to activate the Nw state 250 in the volatile copy of the table stored in the mapping agent 110, step 315. The mapping agents 110 receive and store from the controller 120 the status of the stored Nw state 250 from the controller 120 persistently stored copy of the table 200. In step 310, the controller 120 has already activated the Nw states 250 in the persistently stored copy of the table for all the virtual disk segments 220 to be copied. However, as described above, the blocking flag is activated when the controller 120 attempts to set the status of a state. The blocking flag causes the mapping agent 110 to respond to the controller 120 only after completion of all prior I/O operations, alerting the controller 120 that all changes in-progress are complete in the segment 220 to be moved. Attempting to simultaneously move and write to a segment 220 is undesirable because changes to the segment 220 potentially occurs after migration of the segment 220, so the change may not be recorded.

Following the completion of prior I/O operations, each of the mapping agents 110 responds to the controller 120 and sets the Nw flag 250 according to the controller 120 command, step 320. The Nw state 250 is activated in the mapping agents 110 copy of the table 200 for each of the virtual disk segments 220 to be copied. At this point, the controller 120 receives responses from each mapping agent 110, step 330. The controller 120 then copies the contents of the existing physical storage location 230 to a new physical storage location 230, step 340. The controller 120 has general authority over the administration of the storage devices, as well known in the prior art.

After relocating the specified contents in the storage devices, the controller 120 updates its persistently stored mapping table 200 to reflect the new storage location 230, step 350. After changing the storage location 230, the controller 120 further deactivates any Nw flags previously activated, step 355.

In step 360, the controller 120 sends a "set entry" command to direct the mapping agents 110 to update their mapping tables 200 to match the persistently stored mapping table that was previously amended in step 350. As before, in step 310, the controller 120 command to set data in the table 200 stored in at the mapping agents 110 activates the blocking flag. The blocking flag causes the mapping agent 110 to respond to the controller 120 only after completion of all prior I/O operations, alerting the controller 120 that all changes in-progress are complete in the segment 220 to be moved.

In step 370, after the completion of all prior I/O operations, the mapping agents 110 respond to the controller 120 and update their mapping tables according to command provided by the controller 120 in step 260. Once the controller 120 receives the responses from the agents 110, determined in step 375, the controller 120 knows that all I/O operations to and from the old former segment have completed, so the controller 120 can erase and reuse the old storage location as needed, step 380. Typically, the controller 120 merely writes new data to this storage location.

It should be noted that between steps 320 and 370, the copied entries 220 in the table 200 have an activated Nw state 250 to prevent any I/O operations that change to the contents stored at the old storage location. Any attempt by a host to write to the effected section causes the agent 110 to transmit a fault signal to the controller 120. In response to this type of write failure, the controller 120 waits until the step 350, when the controller 120 sends a replacement table entry 210 to deactivate the Nw state. The agent 110 inserts the new table entry 210 in the table (in place of the former faulty entry) and then retries the I/O operation in step 360. The migration process concludes at step 390.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for moving information from a first physical storage location to a second physical storage location in a virtual storage system for linking a host to the storage locations, the system having an agent connected to the host and a controller connected to the agent controlling the contents of the table, the method comprising:

storing a table with the agent, the table having entries mapping virtual storage disk positions to locations on a storage device, and wherein the table entries include an indication of whether a no-write (Nw) state is activated for each of the table entries, the Nw state indicating whether data contained at the locations on the storage device may be changed;

the controller activating the Nw state for a table entry corresponding to the first physical storage location to indicate to the agent that the data contained at the first physical location cannot be changed;

copying information from the first physical storage location to the second physical storage location;

the controller changing the virtual mapping from the first physical location to the second physical location; and the controller deactivating the Nw state for the table entry corresponding to the second physical storage location.

2. A virtual storage system for moving data accessed over a network from a first storage location to a second storage location on a storage device, the system comprising:

an agent having volatile memory for storing a first copy of a table, the table having entries to map virtual disk positions to locations on the storage device; and a controller coupled to the agent, the controller having non-volatile memory for storing a second copy of the table and means for directing movement of data from the first storage location to the second storage location while the agent controls I/O operations effecting the data at the first storage location based on a state value in one of the entries corresponding to the first storage location in the first copy of the table.

3. The system of claim 2, wherein said agent includes means for updating the first copy of the table in response to direction from the controller to match an updated copy of the second copy of the table.

4. The system of claim 2, wherein the state values for the table entries indicate whether an invalid state is activated such that the invalid state for a table entry becomes activated when that table entry contains no useable mapping information.

5. The system of claim 4, wherein the agent does not allow the host to complete the I/O operations with one of the entries if the invalid state for that entry is activated.

6. The system of claim 2, wherein the state values for the table entries indicate whether a Nw state is activated such that the Nw state for one of the entries becomes activated when data cannot be written to the storage location contained in that entry.

7. The system of claim 6, wherein the agent does not allow the host to write data to the storage location in one of the entries if the no-write state for that entry is activated.

8. The system of claim 2, further comprising a communication channel to couple the agent and the controller.

9. The system of claim 8, wherein the communication channel employs a data transfer protocol to transport messages on the communication channel.

10. The system of claim 2, wherein the entries include an offset.

11. The system of claim 10, wherein the offset includes a logic unit number identifier.

12. The system of claim 10, wherein the offset includes a block identifier.

13. A method for maintaining a table for mapping virtual disk blocks to migrated storage locations on storage devices within a network, comprising:

activating states within entries of the table;

migrating data from a first storage location to a second storage location;

completing operations at the table;

updating the table in response to the command; and setting a blocking flag for one of the table entries corresponding to the first storage location until the completing operations is completed, wherein the blocking flag defines allowable I/O operations for the data in the first storage location.

14. The method of claim 13, further comprising obtaining mapping information from one of the entries in the table.

15. A method for moving data from a first storage location to a second storage location on a storage device in a virtual disk storage system, comprising:

providing an agent having volatile memory for storing a first copy of a table, the table having entries to map virtual disk positions to locations on the storage device;

providing a controller coupled to the agent, the controller having non-volatile memory for storing a second copy of the table;

responsive to a request to move virtual disk data from a first location to a second location, the controller changing the second copy of the table and issuing an order to change the first copy of the table to the agent;

after completion of all prior I/O operations, the agent alerting the controller of completion;

the controller then copying the contents of the first storage location to the second storage location;

the controller then updating the second copy of the table and directing the agent to update the first copy of the table to match the updated second copy of the table; and after completion of all prior I/O operations, the agent updating the first copy of the table to match the updated second copy of the table and responding to the controller.

* * * * *